United States Patent [19]
Boiocchi et al.

[11] Patent Number: 6,003,574
[45] Date of Patent: Dec. 21, 1999

[54] MOTOR-VEHICLE PNEUMATIC TIRE HAVING A TREAD PATTERN FOR SNOW COVERED ROAD SURFACES

[75] Inventors: Maurizio Boiocchi, Segrate; Gianfranco Colombo, Concorezzo, both of Italy

[73] Assignee: Pirelli Coordinamento Pneumatici S.P.A., Milan, Italy

[21] Appl. No.: 08/751,762

[22] Filed: Nov. 8, 1996

[30] Foreign Application Priority Data

Nov. 13, 1995 [IT] Italy .................................. MI95A2327

[51] Int. Cl.⁶ ............................ B60C 11/03; B60C 11/11; B60C 11/12; B60C 115/00
[52] U.S. Cl. .................................. 152/209 R; 152/209 D; 152/DIG. 3
[58] Field of Search .......................... 152/209 R, 209 D, 152/DIG. 3; D12/146, 147, 148, 149

[56] References Cited

U.S. PATENT DOCUMENTS

| | | | |
|---|---|---|---|
| D. 333,455 | 2/1993 | Himuro et al. | D12/147 |
| D. 344,050 | 2/1994 | Overhoff et al. | |
| D. 366,232 | 1/1996 | Ueda | D12/146 |
| 4,456,046 | 6/1984 | Miller | 152/209 R |
| 4,574,856 | 3/1986 | Graas | |
| 4,598,747 | 7/1986 | Flechtner | 152/209 R |
| 4,832,099 | 5/1989 | Matsumoto | 152/209 R |
| 4,962,801 | 10/1990 | Tsuda | |
| 4,986,324 | 1/1991 | Suzuki et al. | 152/209 R |
| 5,031,680 | 7/1991 | Kajikawa et al. | 152/209 R |
| 5,105,864 | 4/1992 | Watanabe et al. | 152/209 R |

FOREIGN PATENT DOCUMENTS

| | | | |
|---|---|---|---|
| 0485883 | 5/1992 | European Pat. Off. | |
| 0609195 | 8/1994 | European Pat. Off. | |
| 2452391 | 11/1980 | France | 152/209 D |
| 4300695 | 7/1994 | Germany | |
| 3-74208 | 3/1991 | Japan | 152/209 R |
| 4-274907 | 9/1992 | Japan | 152/209 R |
| 6-48117 | 2/1994 | Japan | 152/209 R |
| 6055909 | 3/1994 | Japan | |
| 6127218 | 5/1994 | Japan | |
| 6-305308 | 11/1994 | Japan | 152/209 D |

OTHER PUBLICATIONS

European Search Report, Jun. 7, 1996.
Pirelli Tire Catalog, p. 33, "Winter tyres".

*Primary Examiner*—Steven D. Maki
*Attorney, Agent, or Firm*—Stevens, Davis, Miller & Mosher, L.L.P.

[57] ABSTRACT

A tread pattern for motor vehicle winter tires having transverse grooves symmetrically converging toward an equatorial plane "X" of the tire. A pair of circumferential grooves (3) respectively defined by oblique stretches (3a) have an orientation converging toward the equatorial plane "X", in a direction opposite to the rolling direction "D" according to which the transverse grooves (2) converge. Grip hollows (6) of increasing width in a direction opposite to the rolling direction, are formed astride of each transverse groove (2), at two contiguous center blocks (4). A central separation cut (7) between the center blocks (4) defines therein separation walls (7a) arranged to come into mutual contact when in the ground contacting area.

43 Claims, 1 Drawing Sheet

MOTOR-VEHICLE PNEUMATIC TIRE HAVING A TREAD PATTERN FOR SNOW COVERED ROAD SURFACES

BACKGROUND OF THE INVENTION

The present invention relates to a pneumatic tire for vehicle wheels provided with a tread pattern particularly appropriate for running on snow-covered road surfaces, comprising at least two series of transverse grooves disposed on opposite sides relative to an equatorial plane of the tire and symmetrically converging at said equatorial plane. At least two circumferential grooves are symmetrically spaced apart from the equatorial plane of the tire and confine, together with the transverse grooves, one or more rows of center blocks disposed symmetrically to the equatorial plane and at least two rows of shoulder blocks located on respectively opposite sides relative to the center block rows. Thus, the invention concerns motor-vehicle pneumatic tires of the so-called "winter" type.

It is known that modern tires of the above type are required to possess not only excellent behavioral features with reference to traveling on a snow-covered road surface, but also good operating features such as rolling smoothness, ride behavior on a wet road surface and good mileage. The ride behavior on a dry road surface and the ride noiselessness too, although of less importance as compared with the previously mentioned features, help in increasing quality evaluation of a winter tire.

Said behavioral and operating features are achieved by forming appropriate circumferential and transverse grooves in the tread band, which grooves are suitably sized and oriented for formation of blocks usually aligned in rows disposed consecutively side by side and extending circumferentially around the tire.

In addition, an indispensable detail for improving the behavioral running features of a tire on a snow-covered road surface is the presence of appropriate "lamellae" or "fins" in the blocks, that is a plurality of narrow cuts or grooves having a small-sized zig-zag pattern in a circumferential direction, and principally oriented transversely of the rolling direction. The task of these cuts is efficiently collecting and retaining snow, since snow-on-snow friction is, as known, stronger than rubber-on-snow friction.

In more detail, a type of winter tire which has been recently commercialized by the assignee has a pair of circumferential straight-extending grooves in the tread, which grooves are disposed symmetrically on each axial side of the equatorial plane of the tire and spaced apart by a distance substantially corresponding to half the overall width of the tread band.

These circumferential grooves are combined with two series of transverse grooves each extending with a gradually increasing inclination from an outer edge of the tread band until close to the equatorial plane.

The transverse grooves of the two series symmetrically converge toward the equatorial plane of the tire according to a given preferential rolling direction and have their respective vertices consecutively alternated with respect to each other along the circumferential extension of the tread band at its equatorial plane.

In such a tread band, the configuration of the transverse grooves is adapted to promote good traction qualities, by virtue of the mutual convergence of the grooves in the rolling direction.

The circumferential straight-extending grooves, in turn, enable the water present in the ground-contacting area of the tire to be efficiently eliminated during running on a wet road surface, thereby preventing the well known and dangerous aquaplane effect.

The traction capability and, as a whole, the ride behavior on a snow-covered road surface are assisted by the presence of closely spaced fins on the blocks which are generated by the intersection between the longitudinal and transverse grooves and by appropriate straight extending hollows associated with the transverse grooves, in the space between the two circumferential grooves, each of said hollows extending in a circumferential direction over a short length starting from the respective transverse groove.

The Applicants' efforts have been directed towards discovering how said tire could be further improved, in particular regarding the behavioral qualities on a snow-covered road surface.

SUMMARY OF THE INVENTION

In accordance with the present invention, it has been found that by making the circumferential grooves in the form of stretches oriented obliquely to the circumferential direction and symmetrically converging toward the equatorial plane in a direction opposite to the convergence direction of the transverse grooves, it is possible to achieve a greater behavioral homogeneity in the tire in terms of traction and braking capabilities with reference to a ride on a snow-covered road surface.

In more detail, it is an object of the present invention to provide a pneumatic tire for vehicle wheels provided with a tread band molded with a raised pattern particularly appropriate for running on snow-covered road surfaces, in which the circumferential grooves are each defined by a sequence of stretches oriented obliquely to the circumferential direction of the tire. The oblique stretches forming said circumferential grooves are arranged to symmetrically converge at the equatorial plane in a direction opposite to the convergence direction of the transverse grooves.

In more detail, the transverse grooves mutually converge according to a specified direction for that tread band.

The distance between said longitudinal grooves preferably is between 25% and 35% of the overall width of the tread band, measured between the opposite side edges of said band, and each of the oblique stretches of the circumferential grooves extends between two consecutive transverse grooves and defines respectively opposite circumferential edges of a center block and a shoulder block, so that each of said center and shoulder blocks has a corner projecting inwardly of the respective circumferential groove with respect to the opposite corner of the immediately following block.

According to the invention, irrespective of the configuration of the circumferential grooves, at least one grip hollow is preferably associated with each of said transverse grooves, said grip hollows each being of substantially trapezoidal shape and having an inner circumferential edge and an outer circumferential edge which respectively diverge preferably by an angle of between 3° and 15°, in a direction opposite to the rolling direction.

In a preferential embodiment, each of said grip hollows has a maximum width between 3 and 7 mm and extends across one of said transverse grooves at two contiguous center blocks, with the respective inner circumferential edge substantially parallel to the circumferential direction of the tread band.

Also provided is a circumferential central cut extending at the equatorial plane to mutually separate two of said center block rows.

This central cut, at least at one bottom portion thereof, has a width between 2 and 4 mm, and generates two respectively opposite separation walls between each pair of center blocks, each belonging to one of said center rows, which walls are designed to come into mutual contact relation when the tread band is deformed against the roadway.

Advantageously, each of said transverse grooves has an external portion defined between two of said shoulder blocks, in which portion a first and a second consecutive stretches are defined which converge in a direction opposite to the rolling direction.

The first stretch, terminating at the axial side edge of the tread band, preferably has an inclination between 1° and 10° to the axial direction of the tread band, whereas the second stretch communicating with the respective circumferential groove, has an inclination between 8° and 16° to said axial direction.

In addition, preferably each of said transverse grooves is provided with a gradually increasing width, moving away from the equatorial plane.

To this end, said second stretch communicating with the respective circumferential groove, is of a width less than that of the first stretch, terminating at the side edge of the tread band.

Each of said transverse grooves further has an inner portion extending between two center blocks in which a first stretch communicating with the respective circumferential groove and a second stretch extending close to the equatorial plane and having a smaller width than the first stretch of said inner portion are defined, the first stretch of said inner portion preferably being of smaller width than the second stretch of said outer portion.

In addition, the second stretch of said inner portion is circumferentially offset in the rolling direction with respect to the first stretch.

Still in accordance with a preferred embodiment, the oblique stretches forming said circumferential grooves are inclined at an angle between 8° and 22° relative to the circumferential direction of the tread band and intersect the transverse grooves at an angle of between 80° and 110°.

In addition, provision may be also made of auxiliary hollows formed in the shoulder blocks at the convergence points between the first and second stretches of the outer portion of each transverse groove and preferably oriented parallel to the oblique stretches of the circumferential grooves, of less depth than the respective transverse grooves.

Furthermore, the auxiliary hollows of each shoulder block can be mutually interconnected by an auxiliary cut extending parallel to the oblique stretches of the circumferential grooves and having less depth than the auxiliary hollows. Preferably, the transverse grooves further have tapering end portions at the axial side edges of the tread band.

Each of said center and shoulder blocks also has fin-shaped cuts oriented substantially parallel to said transverse grooves.

BRIEF DESCRIPTION OF THE DRAWINGS

Further features and advantages will become more apparent from the following detailed description of a preferred embodiment given hereinafter, by way of non-limiting example, with reference to the accompanying drawings, in which.

DETAILED DESCRIPTION OF PREFERRED EMBODIMENTS

Figure 1:
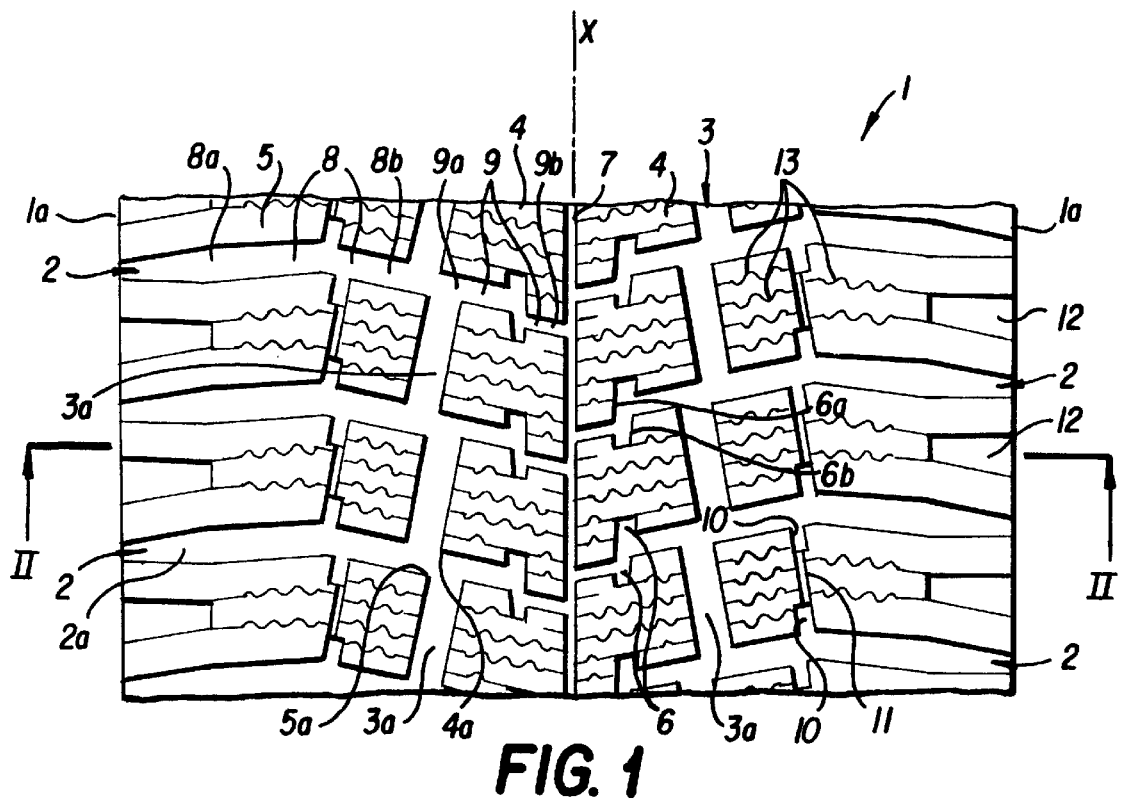
FIG. 1 is a development view in plan of a circumferential portion of the tread subject tread pattern.

With reference to the drawings, a tread band for pneumatic tires in particular adapted for running on snow-covered road surfaces according to the present invention has been generally identified by reference numeral 1; in particular this tread band is for tire size 175/70 R 13.

Said tires have a carcass, preferably of the radial type, reinforced with a belt structure thereover, (which is known in the prior art), a tread band thereover of appropriate elastomer material positioned thereover, which tread band is molded with a raised pattern and is intended for rolling contact on the ground. The tread band 1 has at least two series of transverse grooves, generally denoted by 2, disposed on opposite sides of the equatorial plane of the tire. This equatorial plane is denoted by line "X" in the accompanying drawings.

As can be seen, at least close to the equatorial plane "X" the transverse grooves 2 substantially have a course symmetrically converging at the equatorial plane. An assigned rolling direction is denoted by arrow "D" in FIG. 1.

The tread band 1 further has at least two circumferential grooves, generally identified by 3, disposed symmetrically to the equatorial plane "X" and preferably spaced apart from each other by a distance "L" of between 25% and 35% of the overall width "W" of the tread band 1, measured between the opposite side edges 1a thereof. The circumferential grooves 3 together with the transverse grooves 2 define one or more rows of center blocks 4, disposed symmetrically to the equatorial plane "X" and at least two rows of shoulder blocks 5 located axially outwardly on respectively opposite sides with respect to the center blocks 4.

Advantageously, each of the circumferential grooves 3 is defined by a sequence of stretches 3a oriented obliquely to the circumferential direction of the tire. In more detail, a projection of the oblique stretches 3a forming either of the circumferential grooves 3 would symmetrically converge at the equatorial plane "X" in a direction opposite to the convergence direction of the transverse grooves 2, which is, of course, the rolling direction "D".

Preferably, the inclinations of the transverse grooves 2 and oblique stretches 3a of the longitudinal grooves 3 are selected so that the corners of the shoulder blocks 5 and center blocks 4 generated by the intersection thereof have a summit angle of between 80° and 110°, so that they have an excellent resistance to wear.

More particularly, the inclination of the oblique stretches 3a of the circumferential grooves 3 to the circumferential direction is preferably between 8° and 22°.

Close to the intersection with the corresponding circumferential groove 3, each transverse groove 2 is respectively divided into an outer portion 8, defined between two shoulder blocks 5 and an inner portion 9 confined between two contiguous center blocks 4. Defined along the outer portion 8 of each groove 2 is a first stretch 8a terminating at the side edge of the tread band 1 and a second stretch 8b, consecutive to the first stretch 8a and terminating at the respective circumferential groove 3. The inner portion 9 of each transverse groove 2, in turn, has a first stretch 9a opening into the circumferential groove 3 and a second stretch 9b terminating at the equatorial plane "X". As a whole, the transverse grooves 2 have a gradually increasing width moving axially away from the equatorial plane "X". To this end, the second stretch 8b of the outer portion 8 of each transverse groove 2 has a width preferably between 4 and 9 mm and in any case smaller than the width of the first stretch 8a of the same outer portion 8 which is between 5 and 11 mm.

The width of the first stretch 9a of the inner portion of each transverse groove 2 is smaller than that of the second stretch 8b of the outer portion 8, whereas the second stretch 9b of the inner portion 9 has a smaller width than the first stretch 9a of the same inner portion.

In addition, the second stretches 9b of the inner portions 9 are preferably provided to be offset in the rolling direction "D" with respect to the corresponding first stretches 9a. As shown in FIG. 1, for pairs of inner portions 9 in which one inner portion is on one side of the equatorial plane "X" and another inner portion is on the opposite side of the equatorial plane "X", one of the stretches 9a is laterally across from one of the stretches 9b on the opposite side of the equatorial plane "X". This enables the mutual convergence effect of the transverse grooves 2 to be stressed close to the equatorial plane "X", without a reduction of the angle formed by said grooves with the circumferential direction of the tread band, which, of course, is coincident with the equatorial plane itself. In fact, this angle is substantially constant at least over the whole extension of the inner portion 9 and preferably between 8° and 16° with respect to the axial direction.

Preferably, as shown in FIG. 1, the inclination of the second stretch 8b of the outer portion 8 has the same value as the inclination of stretches 9a, 9b of the inner portion 9. The first stretch 8a of the outer portion 8 of each transverse groove 2 instead has an inclination of between 1° and 10°, still with respect to the axial direction, facing away from that of the second stretch 8b of the same outer portion. In this manner, stretches 8a, 8b of the outer portion 8 mutually converge in a direction opposite to the rolling direction "D".

Figure 2:
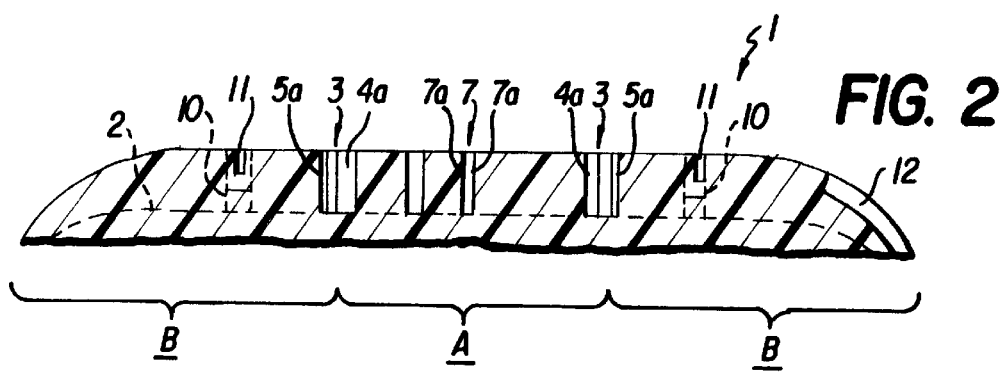
FIG. 2 is a cross-sectional view of the tread taken along line II—II in FIG. 1.

In conclusion, the mutual arrangement of the longitudinal grooves 3 and transverse grooves 2 is such that in the tread band 1 width a central area denoted by "A" in FIG. 2 and two side areas denoted by "B" are defined. The central area A is occupied by the center blocks 4 and is specifically appropriate to enhance the traction capability features of the tire, whereas the side areas "B" have the task of ensuring good performance on braking, that is when the tangential stresses taking place between the tread band and the roadway are directed in the opposite way as compared with what happens on traction.

With reference to the central area "A", it should be noted in fact that the transverse grooves 2 converge at the equatorial plane "X" according to a substantially V-shaped configuration, the vertex of which points towards the rolling direction "D". On running on a snow-covered road surface, each pair of transverse grooves 2 belonging to the same block pitch comes into contact with the roadway at the ground-contacting area, first by its own vertex which is immediately filled with snow. Progressive entering of snow along the remaining parts of the transverse grooves, as rolling goes on, causes the snow present at the above mentioned "V" vertex to become packed, so that, as a result, said snow is retained by the transverse grooves, to advantage of good traction capability.

In order to ensure an efficient snow collection and retention effect, grip hollows 6 of substantially trapezoidal form are also provided to be associated with the transverse grooves 2. Said hollows 6 each have an inner circumferential edge 6a and an outer circumferential edge 6b that respectively diverge according to an angle of between 3° and 15° in a direction opposite to the rolling direction "D". In a preferred embodiment, each grip hollow 6 which completely crosses the corresponding transverse groove 2 thereby extending into two contiguous center blocks 4, is provided to have a maximum width, at its widest point of between 3 and 7 mm and its inner circumferential edge 6a is oriented parallel to the circumferential extension direction of the tread band.

On running, each grip hollow 6 reaches the ground contact area first by its narrower portion which is immediately filled with the snow present on the roadway. As rolling goes on, the larger end portion of the grip hollow 6 is filled with snow also and, by effect of the vertical load, said snow is forced into the hollow itself. So the snow which had already filled the narrower portion of the hollow is wedged between the mutually converging circumferential edges 6a and 6b and becomes therein packed. Thus the grip hollows 6 appear to be capable of efficiently collecting and retaining the snow present on the roadway.

In order to improve the operating conditions of the central portion "A", it is also preferably provided that the rows of center block 4 be mutually separated by at least one central circumferential cut 7 located at the equatorial plane "X". This central cut, at least near the bottom of its depth, has a relatively reduced width, of, by way of example, between 2 and 4 mm, so that between each pair of side-by-side center blocks 4 two separation walls 7a are generated which are adapted to come into mutual contact relation when, at the ground-contacting area, the tread band 1 is deformed against the roadway, thereby modifying its transverse profile from a starting convex configuration to a final flattened configuration.

In conclusion, the central cut 7 performs the function of defining a pliability point in the tread band 1 so as to enable said band to be easily flattened against the roadway without causing elastic deformations in the remaining parts of the central area "A", in that said deformations would facilitate an undesired ejection of the snow entrapped in the grooves 2, 3 and grip hollows 6. The mutual mating of the opposite walls 7a further increases packing of the snow within the transverse grooves 2 and, when a vehicle is running alternately on a snow-covered roadway and on a wet or dry roadway, a structural stabilization of the tread band in the central area A is determined, to advantage of the directional features of the tire.

The longitudinal grooves 3 separate the central area "A" from the side areas "B" and the configuration of said grooves is susceptible of determining advantages both under running and braking conditions.

In fact, the oblique and parallel orientation of the inclined stretches 3a is such that the longitudinal groove 3 is given a broken-line course, in which each oblique stretch 3a extends between two contiguous transverse grooves 2 and defines the opposite confronting circumferential edges of one of the center blocks 4 and one of the shoulder blocks 5, respectively.

Under this situation, each of the center blocks 4 and shoulder blocks 5, has a corner 4a, 5a projecting inwardly of the respective circumferential groove 3 with respect to the opposite corner of the immediately following block. Under this situation, the projecting corners 4a of the center blocks behave like teeth ensuring a grip on the snow upon traction, whereas the projecting corners 5a of the shoulder blocks 5 produce the same effect upon braking.

With reference to the outer portions "B" it is to be noted that the first and second stretches 8a, 8b of the outer portion 8 of each transverse groove 2 have such an orientation that they converge in a direction opposite to the rolling direction "D", thereby forming an inverted-vertex "V", as compared with the one formed by the central portions 9 of the same grooves.

Under this situation, the outer portions 8 furnish an efficient grip action on the snow, in particular during braking, that is when the tangential efforts transmitted by the tread band 1 on the roadway are in the opposite direction with respect to the case in which traction occurs.

In order to further increase the grip on a snow-covered road surface, both under traction and under braking conditions, it is also provided that close to the convergence points between the first and second stretches 8a, 8b of the outer portion 8 of each transverse groove 2, opposite auxiliary hollows 10 be provided, which are oriented substantially parallel to the oblique stretches 3a of the circumferential grooves 3 and preferably have a lower depth than the transverse grooves 2.

Preferably the auxiliary hollows 10 belonging to each shoulder block 5 are mutually connected by an auxiliary cut 11 extending parallel to the above mentioned oblique stretches 3a and preferably having a lower depth than said auxiliary hollows 10.

In order to prevent the snow collected in the transverse grooves 2 from being discharged laterally, the transverse grooves are preferably provided with tapering portions at the ends 2a close to the opposite side edges 1a of the tread band 1. Still for the purpose of optimizing the tread band grip on the snow-covered road surface, both under traction and braking conditions, at least one additional side hollow 12 may be formed in each of the shoulder blocks 5. Said additional side hollow 12 substantially has the same width as the transverse grooves 2 and extends axially and parallel to the transverse grooves starting from the corresponding side edge of the tread band 1.

Each of the center 4 and shoulder 5 blocks is further provided with a plurality of zig-zag fin-shaped cuts 13, of the type usually adopted in winter tires and usually named "lamellae".

In a preferred embodiment, these lamellae 13 have a course substantially parallel to that of the transverse grooves 2 and are circumferentially spaced apart the same distance from each other at the axial inside of each block 4, 5, so that each block is divided into a plurality of portions substantially having the same shape and geometric extension. This expedient enables the achievement of an excellent evenness of wear in the blocks 4, 5 and therefore a satisfactory mileage yield, the tread band as a whole thereby offering constant performance.

It is also to be noted that, as clearly shown in FIG. 1, in order to reduce the rolling noise of the tire, the pattern defined by the series of cuts and grooves present in one half of the tread band 1 is circumferentially offset by a pitch fraction as compared with the other half arranged in a mirror image on the axial opposite side of the equatorial plane "X".

The subject tire has furnished greatly higher performance than the best competitive products present on the market, not only as regards its running behavior on a snow-covered road surface, which is the most important item in judging a winter tire, but also as regards its resistance to rolling, ride behavior on a wet roadway and driving on a dry roadway.

The inventive tire has also achieved very satisfactory results in terms of behavior on a frozen roadway, ride comfort and noiselessness on running.

Obviously many modifications and variations can be made to the tire as conceived without departing from the scope of the present invention as defined by the appended claims.

We claim:

1. A pneumatic tire for motor-vehicle wheels, comprising a tread band provided with a raised pattern particularly appropriate for running on snow-covered road surfaces, comprising:

at least two series of transverse grooves disposed on axial opposite sides relative to an equatorial plane of the tire and symmetrically converging toward said equatorial plane;

at least two circumferential grooves symmetrically spaced apart from the equatorial plane of the tire and defining, together with the transverse grooves, two rows of center blocks, one said row being disposed symmetrically on each axial side of the equatorial plane and at least two rows of shoulder blocks located on respectively opposite sides relative to the center block rows, at least a pair of blind grip hollows associated with each of said transverse grooves, wherein each grip hollow of said pair of grip hollows is defined respectively by each center block of a pair of opposed center blocks of the same row of center blocks, said grip hollows extending transversely to its associate transverse groove and having an increasing width in a direction opposite to an assigned rolling direction of said tread band.

2. A pneumatic tire according to claim 1, wherein the grip hollows of each said pair of grip hollows are directly opposed.

3. A pneumatic tire according to claim 1, wherein the grip hollows of each said pair of grip hollows cooperatively define a hollow and the width of the cooperatively defined hollow increases in a direction opposite to the assigned rolling direction of the tread band.

4. A pneumatic tire according to claim 1, in which each of said transverse grooves has an inner portion extending between two center blocks, the inner portion including a first stretch communicating with a respective circumferential groove and a second stretch extending close to the equatorial plane having a smaller width than the first stretch of said inner portion, wherein pairs of said transverse grooves on opposed sides of the equator of the tire are circumferentially offset such that the first stretch of a first transverse groove of said pair of transverse grooves is lateral to the second stretch of a second transverse groove of said pair of transverse grooves.

5. A pneumatic tire according to claim 1, in which each of said transverse grooves has an inner portion extending between two center blocks, comprising a first stretch (9a) communicating with a respective circumferential groove and a second stretch (9b) extending close to the equatorial plane, wherein said first stretch (9a) and said second stretch (9b) are each other circumferentially offset.

6. A pneumatic tire according to claim 1, wherein said grip hollows of each said pair of grip hollows are aligned in a circumferential direction.

7. A pneumatic tire for vehicle wheels comprising a tread band provided with a raised pattern particularly appropriate for running on snow-covered road surfaces, comprising:

at least two series of transverse grooves disposed on axial opposite sides relative to an equatorial plane of the tire and symmetrically converging toward said equatorial plane;

at least two circumferential grooves symmetrically spaced apart from the equatorial plane of the tire and defining, together with the transverse grooves, at least one row of center blocks;

at least two rows of shoulder blocks located on respectively axial opposite sides relative to the at least one row of center blocks, said circumferential grooves each being defined by a sequence of groove stretches oriented obliquely to the circumferential direction of the tire, wherein extensions of said oblique stretches which form said circumferential grooves symmetrically converge at the equatorial plane in a direction opposite to the convergence direction of the transverse grooves, at least a pair of circumferential blind grip hollows is associated with each of said transverse grooves, wherein each grip hollow of said pair of grip hollows is defined by each center block of a pair of opposed center blocks of the same row of center blocks, said grip hollows being of substantially trapezoidal shape and having an inner circumferential edge and an outer circumferential edge which respectively diverge in a direction opposite to an assigned rolling direction of the tread band.

8. A pneumatic tire according to claim 7, in which said inner circumferential edge and said outer circumferential edge mutually diverge by an angle between 3° and 15°.

9. A tire according to claim 7, in which each of said grip hollows has a maximum width between 3 and 7 mm.

10. A tire according to claim 7, in which said inner circumferential edge is substantially parallel to the circumferential direction of the tire.

11. A pneumatic tire according to claim 7, in which each of said grip hollows are circumferentially aligned across one of said transverse grooves at each said pair of center blocks.

12. A pneumatic tire according to claim 7, further comprising two rows of center blocks and a circumferential central cut located at the equatorial plane to mutually separate said two rows of center blocks, wherein said two rows of center blocks are defined by the circumferential central cut and respective said circumferential groove.

13. A pneumatic tire according to claim 12, in which the central cut defines two respectively opposite separation walls between each pair of center blocks each being part of one of said center rows, said separation walls being formed to come into contact with each other when the tread band is locally deformed into a flattened conformation.

14. A pneumatic tire according to claim 13, in which the central cut has a width between 2 and 4 mm at least in a bottom portion thereof.

15. A pneumatic tire according to claim 7, in which each of said transverse grooves has an outer portion confined between two of said shoulder blocks, in which portion a first and a second consecutive transverse groove stretches are defined which converge in a direction opposite to an assigned rolling direction.

16. A pneumatic tire according to claim 15, in which the first stretch of the outer portion of the transverse groove is at a side edge of the tread band, and has an inclination of between 1° and 10° to the axial direction of the tread band.

17. A pneumatic tire according to claim 15, in which said second stretch of the outer portion of the transverse groove which communicates with a respective circumferential groove, has an inclination of between 8° and 16° to the axial direction of the tread band.

18. A pneumatic tire according to claim 15, in which said second stretch of the outer portion of the transverse groove which communicates with a respective circumferential groove, is of a width smaller than that of the first stretch of the outer portion of the transverse groove which terminates at a side edge of the tread band.

19. A pneumatic tire according to claim 15, in which each of said transverse grooves further has an inner portion extending between two center blocks, in which a first stretch of the inner portion communicates with a respective circumferential groove and a second stretch of the inner portion extending close to the equatorial plane has a smaller width than the first stretch of said inner portion.

20. A pneumatic tire according to claim 19, in which the first stretch of said inner portion is of smaller width than the second stretch of said outer portion.

21. A pneumatic tire according to claim 19, in which the second stretch of said inner portion is circumferentially offset in the rolling direction with respect to the first stretch of the inner portion.

22. A pneumatic tire according to claim 15, further comprising auxiliary hollows formed in the shoulder blocks at the convergence points between the first and second stretches of the outer portion of each transverse groove.

23. A pneumatic tire according to claim 22, in which said auxiliary hollows are elongate and oriented parallel to the oblique stretches of the circumferential grooves.

24. A pneumatic tire according to claim 22, in which the auxiliary hollows of each shoulder block are mutually interconnected by an auxiliary cut extending parallel to the oblique stretches of the circumferential grooves.

25. A pneumatic tire according to claim 24, in which the auxiliary cut has a smaller depth than the auxiliary hollows.

26. A pneumatic tire according to claim 7, in which each of said transverse grooves has a gradually increasing width as measured at parts thereof, moving away from the equatorial plane.

27. A pneumatic tire according to claim 7, in which the oblique stretches forming said circumferential grooves are inclined at an angle between 8° and 22° relative to the circumferential direction of the tire.

28. A pneumatic tire according to claim 7, in which the oblique stretches of the circumferential grooves intersect the transverse grooves at an angle of between 80° and 110°.

29. A pneumatic tire according to claim 7, in which the transverse grooves have tapering end portions at side edges of the tread band.

30. A pneumatic tire according to claim 7, in which the distance between said longitudinal grooves is between 25% and 35% of an overall width of the tread band, as measured between the opposite side edges of said tread band.

31. A pneumatic tire according to claim 7, in which each of said center and shoulder blocks has zig-zag cuts oriented substantially parallel to said transverse grooves.

32. A pneumatic tire according to claim 7, in which each of the oblique stretches of the circumferential grooves extends between two consecutive transverse grooves and defines respectively opposite circumferential edges of a center block and a shoulder block, so that each of said center and shoulder blocks has a corner projecting inwardly of the respective circumferential groove with respect to an opposite corner of an immediately following block.

33. A pneumatic tire according to claim 7, wherein said at least one row of said center blocks comprises a member selected from the group consisting of a single row of said center blocks through which the tire equatorial plane passes and two rows of said center blocks which are separated by a circumferential central cut located at the equatorial plane.

34. A pneumatic tire according to claim 7, wherein the grip hollows of each said pair of grip hollows cooperatively define a hollow and the width of the cooperatively defined hollow increases in a direction opposite to the assigned rolling direction of the tread band.

35. A pneumatic tire according to claim 7, in which each of said transverse grooves has an inner portion extending between two center blocks, the inner portion including a first stretch communicating with a respective circumferential groove and a second stretch extending close to the equatorial plane having a smaller width than the first stretch of said inner portion, wherein pairs of said transverse grooves on opposed sides of the equator of the tire are circumferentially offset such that the first stretch of a first transverse groove of said pair of transverse grooves is lateral to the second stretch of a second transverse groove of said pair of transverse grooves.

36. A pneumatic tire according to claim 7, in which each of said transverse grooves has an inner portion extending between two center blocks, comprising a first stretch (9a) communicating with a respective circumferential groove and a second stretch (9b) extending close to the equatorial plane, wherein said first stretch (9a) and said second stretch (9b) are each other circumferentially offset.

37. A pneumatic tire according to claim 7, wherein said grip hollows of each said pair of grip hollows are aligned in a circumferential direction.

38. A pneumatic tire for vehicle wheels comprising a tread band provided with a raised pattern particularly appropriate for running on snow-covered road surfaces, comprising:

at least two series of transverse grooves disposed on axial opposite sides relative to an equatorial plane of the tire and symmetrically converging toward said equatorial plane;

at least two circumferential grooves symmetrically spaced apart from the equatorial plane of the tire and defining, together with the transverse grooves, at least one row of center blocks;

at least two rows of shoulder blocks located on respectively axial opposite sides relative to the at least one row of center blocks, said circumferential grooves each being defined by a sequence of groove stretches oriented obliquely to the circumferential direction of the tire, wherein extensions of said oblique stretches which form said circumferential grooves symmetrically converge at the equatorial plane in a direction opposite to the convergence direction of the transverse grooves, wherein said at least one row of said center blocks comprises a member selected from the group consisting of a single row of said center blocks through which the fire equatorial plane passes and two rows of said center blocks, at least a pair of blind grip hollows associated with each of said transverse grooves, wherein each grip hollow of said pair of grip hollows is defined by each center block of a pair of opposed center blocks of the same row of center blocks, said grip hollows being of substantially trapezoidal shape and having an inner circumferential edge and an outer circumferential edge which respectively diverge in a direction opposite to an assigned rolling direction of the tread band, wherein said transverse grooves mutually converge according to the assigned rolling direction for the tread band.

39. A pneumatic tire according to claim 38, comprising said two rows of center blocks, wherein said center blocks are separated by a circumferential central cut located at the equatorial plane.

40. A pneumatic tire according to claim 38, wherein the grip hollows of each said pair of grip hollows cooperatively define a hollow and the width of the cooperatively defined hollow increases in a direction opposite to the assigned rolling direction of the tread band.

41. A pneumatic tire according to claim 38, in which each of said transverse grooves has an inner portion extending between two center blocks, the inner portion including a first stretch communicating with a respective circumferential groove and a second stretch extending close to the equatorial plane having a smaller width than the first stretch of said inner portion, wherein pairs of said transverse grooves on opposed sides of the equator of the tire are circumferentially offset such that the first stretch of a first transverse groove of said pair of transverse grooves is lateral to the second stretch of a second transverse groove of said pair of transverse grooves.

42. A pneumatic tire according to claim 38, in which each of said transverse grooves has an inner portion extending between two center blocks, comprising a first stretch (9a) communicating with a respective circumferential groove and a second stretch (9b) extending close to the equatorial plane, wherein said first stretch (9a) and said second stretch (9b) are each other circumferentially offset.

43. A pneumatic tire according to claim 38, wherein said grip hollows of each said pair of grip hollows are aligned in a circumferential direction.

* * * * *